Aug. 9, 1932.  C. C. FUERST  1,870,620
SELF ERECTING FRONT MECHANISM FOR CAMERAS
Filed Oct. 6, 1930    2 Sheets-Sheet 1

Inventor
Carl C. Fuerst,
By
Newton M. Perris
George A. Gillette, Jr.
Attorneys

Aug. 9, 1932.  C. C. FUERST  1,870,620
SELF ERECTING FRONT MECHANISM FOR CAMERAS
Filed Oct. 6, 1930  2 Sheets-Sheet 2

Inventor
Carl C. Fuerst,
By Newton M. Perrins
George A. Gillette, Jr.
Attorneys

Patented Aug. 9, 1932

1,870,620

UNITED STATES PATENT OFFICE

CARL C. FUERST, OF ROCHESTER, NEW YORK, ASSIGNOR TO EASTMAN KODAK COMPANY, OF ROCHESTER, NEW YORK, A CORPORATION OF NEW YORK

SELF-ERECTING FRONT MECHANISM FOR CAMERAS

Application filed October 6, 1930. Serial No. 486,650.

This invention relates to folding cameras and more particularly to the erecting mechanism of self-erecting front cameras.

The principal objects of my invention are the provision in a self-erecting front folding camera of a positive erecting means, of a positive holding means maintaining the front erect and of an erecting link performing each of these functions in different positions. Other objects of my invention will be obvious to those familiar with folding cameras as the description of the invention proceeds hereinafter.

The construction here disclosed is an improvement over the construction shown in my copending application, Serial No. 408,687, filed November 21, 1929, and issued October 6, 1931 as Patent No. 1,826,243.

In the accompanying drawings like reference numerals designate similar parts and the various figures illustrate the following views.

The camera body 1 has a bed 2 hinged at 3 to camera body 1 forming in closed position a cover therefor. An arm 4 is pivoted in the free end of bed 2 to form a support for the camera in open position.

Figure 4:
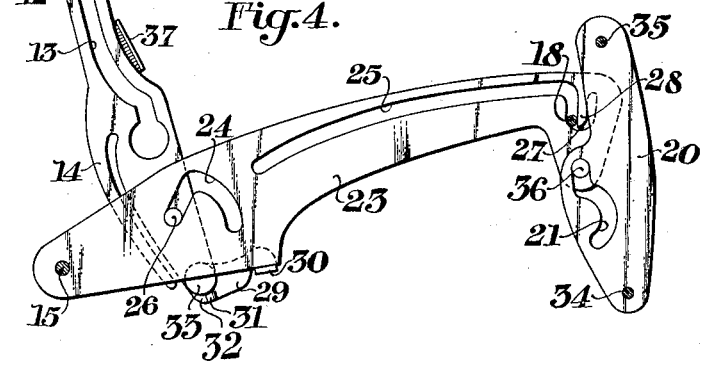
Figs. 4 and 5 are fragmentary inner side elevations of the erecting linkages in fully opened and closed positions, respectively.

A bellows 5 extends from the interior of the camera body 1 to a lens board 6 which has mounted thereon a finder 7 and a shutter 8. An objective may be mounted in the usual cell 9 (only one of which is shown), which is positioned in said shutter 8. A lug 10 with an ear 11 is provided on each side of the bed 2 near the camera body 1. Bed braces 12 provided with slots 13 and resilient arms 14 are pivoted by means of rivets 33 to lugs 10. Studs 15, see Fig. 4, are mounted within the camera body 1 and move within slots 13 in bed braces 12 to engage the upper ends of said slots 13 and to hold the bed 2 perpendicular to camera body 1, studs 15 being forced into the upper ends of slots 13 by the action of ears 11 on resilient arms 14.

On each side of the lens board 8 is a centrally located forwardly extending lug 16 and a lower forwardly extending ear 17.

A slot 38 is provided in the lens board 6 spaced from and parallel to the sides thereof so that the position of a pin 18 on ear 17 may be adjusted by bending the tongue 39 thus formed in the lens board 6.

An upstanding lug 19 is positioned on each side of bed 2 slightly inside lug 10 and has hinged thereon by means of rivets 34 a forward link 20 which is provided with an arcuate slot 21 and which has its upper end hinged to lug 16 by rivets 35.

A bearing lug is positioned on each side of the bed 2 longitudinally between the hinge 3 and the lug 10 and laterally between the lug 10 and the lug 19. Hinged braces 23 are pivotally connected to each of lugs 22 and are provided with arcuate slots 24 and longitudinal slots 25. Pins 26 are positioned on the inner sides of bed braces 12 to move within said arcuate slots 24 in hinged braces 23. The longitudinal slots 25 have substantially perpendicular enlargements 27 at the lens board ends and receive pins 18 on the ears 17 of the lens board 6. Rivets 36 are positioned on the free ends of hinged braces 23 and are adapted to engage arcuate slots 21 in the forward links 20.

The construction thus far described is either well known or disclosed in my copending application No. 408,687, filed November 21, 1929, and issued October 6, 1931, as Patent No. 1,826,243.

Within the enlargements 27 of longitudinal slots 25 are centrally located tongues 28 which are integral with hinged braces 23 and which exert a resilient pressure on pins 18 when the camera is in fully extended position. Tongues 28 may be bent to vary the pressure exerted on pins 18 thus affording a very satisfactory manufacturing adjustment.

Figure 5:
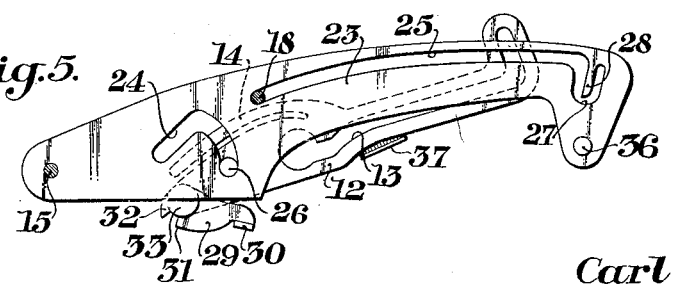

An erecting link 29 is pivotally mounted upon each of the rivets 33 inside of the bed braces 12 as best shown in Figs. 4 and 5. A projecting lip 30, see Fig. 4, is integral with each link 29 and is adapted to abut the lower edges of hinged braces 23. An offset portion 31 is also integral with each of the erecting links 29 and the offset is such that the end of portion 31 is in the same plane as bed brace 12. The lower end of bed brace 12 has a shoulder 32 which is adapted to abut offset portion 31 during the latter part of the erecting operation and which is in angular spaced relative to set offset portion 31 during closed position of the camera, see Fig. 5.

The function of erecting link 29 is described hereinafter.

In closed position of the camera the erecting link 29 is inoperative, see Fig. 5.

In partially open position, as shown in Fig. 4 the erecting link 29 is still inoperative and is free to move.

Figure 1:
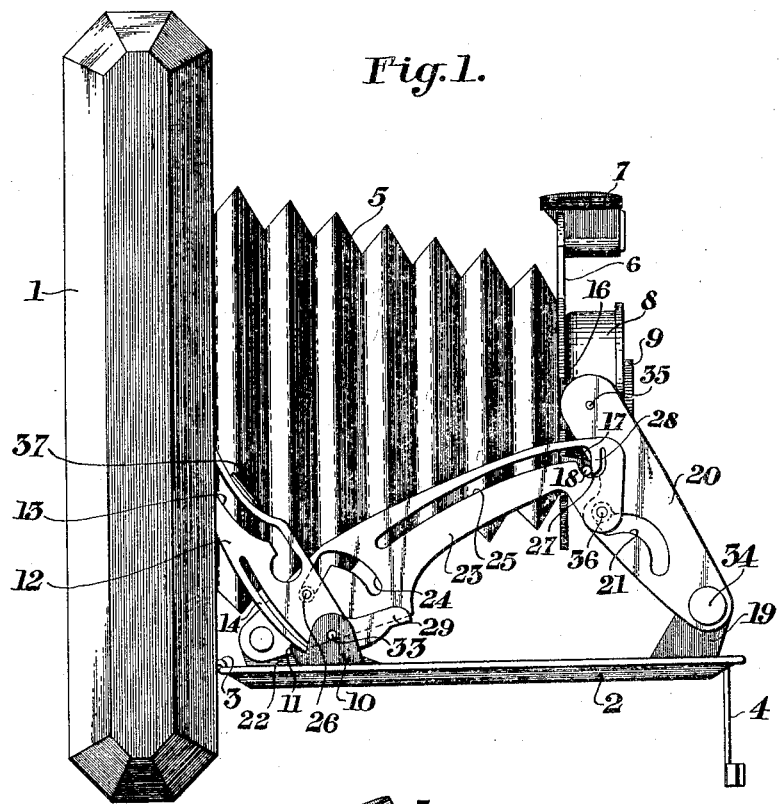
Fig. 1 is a side elevation of a folding camera according to my invention in open position.
Figure 2:
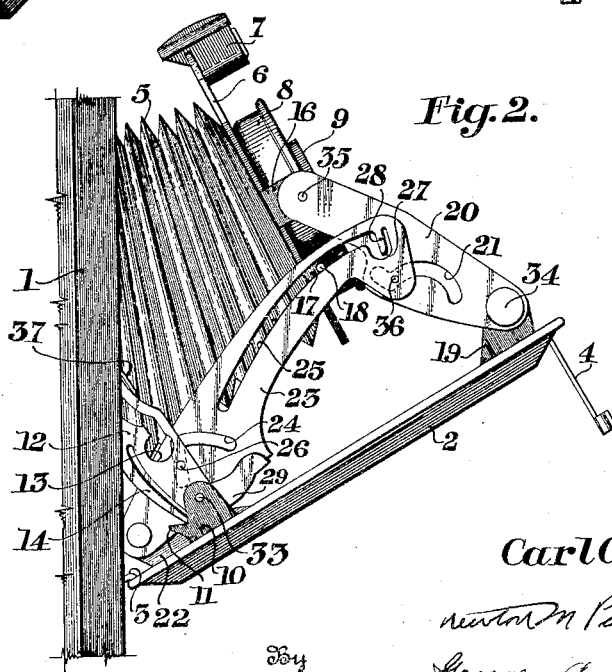
Fig. 2 is a fragmentary side elevation of the camera showing the same in partially closed position.
Figure 3:
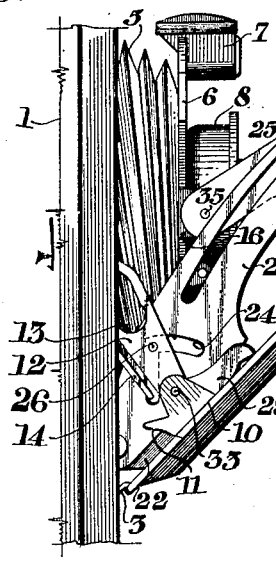
Fig. 3 is also a fragmentary side elevation of the camera in partially closed position, being closed more than in Fig. 2.
Figure 6:
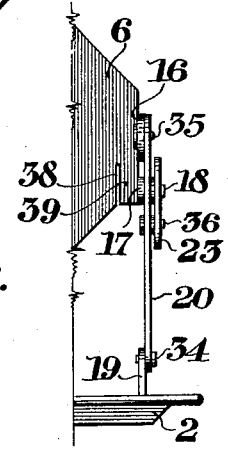
Fig. 6 is a fragmentary front elevation of the lens board and supporting structure.

As the pins 18 arrive near the lens board end of slot 25 in hinged brace 23 the erecting link comes into abutting relation to the hinged brace 23, see Fig. 2, and offset portion 31 of the erecting link 29 abuts the shoulder 32 on bed brace 12.

As lowering of the bed 2 continues hinged brace 23 is raised, pin 26 is moved to the inner end of arcuate slot 24, pin 18 of the lens board 6 is moved into enlargement 27 against tongue 28 and stud 15 moves into the end of slot 13 of the bed brace 12. The camera is now fully opened and the erecting link 29 now performs a holding function until pressure is exerted on the milled thumb pieces 37 which are centrally located on the edges of bed braces 12.

By pivoting the erecting link on rivet 33 of lug 10, the point of application of the force exerted by the erecting link 29 is at a considerable distance from the fulcrum for hinged brace 23 with resultant increased mechanical advantage for the same length of erecting link and actuation of the erecting link 29 by bed brace 12 is rendered possible.

As many varied uses of the erecting link of the present invention are possible, it is to be understood that the use of said erecting link may be applicable to other types of self-erecting front cameras other than that described herein, and the use of said erecting link is to be limited only as defined in the following claims.

Having thus described my invention, what I claim as new and desire to secure by Letters Patent is:

1. In a folding camera, the combination with a body, a bed hinged thereto, a brace for supporting the bed, a foldable lens assembly swingingly supported by the bed and a hinged brace for erecting said foldable lens assembly, of a link mechanism actuated by said bed brace, and actuating said hinged brace, whereby an erecting movement is created therein.

2. In a folding camera, the combination with a body, a bed hinged thereto, a brace for supporting the bed, slot and pin means maintaining the bed brace in supporting position, a foldable lens assembly swingingly supported by the bed and a hinged brace for erecting said foldable lens assembly, of a link mechanism supporting said bed brace and said hinged brace in fully opened position of the camera, whereby the foldable lens assembly is held erect.

3. In a folding camera, the combination with a body, a bed hinged thereto and a foldable lens assembly, of a brace for supporting the bed, a hinged brace for moving the foldable lens assembly to erect position, and a link means actuated by said bed brace and actuating said hinged brace, whereby movement of the bed causes movement of the bed brace, link means and hinged brace.

4. In a folding camera, the combination with a body, a bed hinged thereto and a foldable lens assembly, of a brace for supporting the bed and having a shoulder, a hinged brace for moving said foldable lens assembly to erect position, and an erecting link having an offset portion adapted to abut said shoulder and having a lip adapted to engage said hinged brace, whereby said hinged brace is positively raised during lowering of said bed.

5. In a folding camera, the combination with a body, a bed hinged thereto and a foldable lens assembly, of a brace for supporting the bed and having a shoulder, a hinged brace for moving said foldable lens assembly to erect position, an erecting link having an offset portion abutting said shoulder and having a projecting lip engaging said hinged brace and a pivotal support on said bed for pivoting the lower end of said bed brace and for pivoting said erecting link, whereby the mechanical advantage of said erecting link is increased.

6. In a folding camera, the combination with a body, a bed, a hinge therebetween and a foldable lens assembly, of a brace for supporting the bed and having a shoulder, a hinged brace for moving the foldable lens assembly to erect position, an erecting link having an offset portion abutting said shoulder and having a projecting lip engaging said hinged brace, and a pivotal support on the bed adjacent the hinge for said bed and a second pivotal support on said bed spaced farther from the hinge thereof for pivotally supporting the lower end of said bed brace and said erecting link.

7. In a folding camera, the combination with a body, a bed, a hinge therebetween and a foldable lens assembly, of a brace for supporting the bed and having a shoulder, a hinged brace for moving the foldable lens assembly to erect position, an erecting link having an offset portion abutting said shoulder and having a projecting lip engaging said hinged brace, a pivotal support for said hinged brace on the bed adjacent the hinge for said bed and a second pivotal support on said bed spaced farther from the hinge thereof for pivoting the lower end of said bed brace and for pivoting said erecting link, said projecting lip engaging said hinged brace at a point farther from the pivotal support for the hinged brace than from the pivotal support for the bed brace and erecting link.

8. In a folding camera, the combination with a body, a bed hinged thereto, a foldable lens assembly swingingly supported by the bed and a hinged brace for holding the foldable lens assembly erect, of a brace for supporting the bed hinged thereto and having a shoulder, and an erecting link actuating said hinged brace and having an offset portion engaging said shoulder in operative position of the camera and in angular spaced relation to said shoulder in closed position of said camera, this relationship existing for an interval preceding the fully opened and fully closed positions of the camera.

9. In a folding camera, the combination with a body, of a bed hinged thereto, a brace for supporting the bed, a pivotal support for the brace, a foldable lens assembly, a hinged link cooperating therewith and pivotally mounted on the bed, and an erecting link mounted to turn on the pivotal support for the brace, said brace and link each including parts adapted to engage and to transmit movement from the brace to the link during at least a portion of the movement of the brace.

Signed at Rochester, New York this 1st day of October, 1930.

CARL C. FUERST.